United States Patent [19]
Brown et al.

[11] Patent Number: 4,753,832
[45] Date of Patent: Jun. 28, 1988

[54] BARRIER LAMINATES FOR THE RETENTION OF ESSENTIAL OILS, VITAMINS AND FLAVORS IN CITRUS BEVERAGES AND A METHOD OF MAKING SAID LAMINATE AND LEAK-TIGHT CONTAINERS THEREFROM

[75] Inventors: Michael T. Brown, Cleves; Andrew J. Wnuk, Fairfield, both of Ohio

[73] Assignee: The Procter & Gamble Company, Cincinnati, Ohio

[21] Appl. No.: 900,371

[22] Filed: Aug. 29, 1986

Related U.S. Application Data

[63] Continuation-in-part of Ser. No. 774,276, Sep. 10, 1985, abandoned.

[51] Int. Cl.⁴ .................. B65D 5/56; B65D 85/00
[52] U.S. Cl. .................................... 428/35; 229/3.1; 229/176; 426/106; 426/127; 426/398; 428/481; 428/483; 493/96
[58] Field of Search ............. 426/106, 127, 398; 229/3.1, 3.5 R, 176; 428/35, 481, 483; 493/96

[56] References Cited

U.S. PATENT DOCUMENTS

| | | | |
|---|---|---|---|
| 3,904,104 | 9/1975 | Kane | 229/3.5 |
| 3,939,025 | 2/1976 | Kane | 428/481 |
| 3,972,467 | 8/1976 | Whillock et al. | 229/14 |
| 4,147,836 | 4/1979 | Middleton et al. | 428/481 |
| 4,260,099 | 4/1981 | Mode | 426/115 |
| 4,263,094 | 4/1981 | Login et al. | 162/164 |
| 4,284,671 | 8/1981 | Cancio et al. | 428/35 |
| 4,322,003 | 3/1982 | Long | 206/525 |
| 4,337,116 | 6/1982 | Foster et al. | 162/158 |
| 4,355,756 | 10/1982 | Furuya et al. | 229/4.5 |
| 4,391,833 | 7/1983 | Self et al. | 428/481 |
| 4,424,242 | 1/1984 | Barbee | 428/35 |
| 4,455,184 | 6/1984 | Thompson | 156/244 |
| 4,489,120 | 12/1984 | Hollinger, Jr. | 428/182 |
| 4,513,036 | 4/1985 | Thompson et al. | 428/35 |
| 4,546,170 | 10/1985 | Barbee et al. | 528/302 |
| 4,557,888 | 12/1985 | Rausing et al. | 264/230 |
| 4,559,257 | 12/1985 | Nilsson | 428/152 |
| 4,571,340 | 2/1986 | Ferrante et al. | 426/128 |
| 4,698,246 | 10/1987 | Gibbons et al. | 428/35 |

FOREIGN PATENT DOCUMENTS 53-077261 7/1978 Japan .
58-224742A 12/1983 Japan .

OTHER PUBLICATIONS

Kail, the Use of Flexible Films in Non-Flexible Packaging, Journal of Plastic Film & Sheeting, pp. 78–84 (vol. 1, Jan. 1985).

Primary Examiner—J. E. Kittle
Assistant Examiner—James J. Seidleck
Attorney, Agent, or Firm—John J. Ryberg; E. Kelly Linman; John V. Gorman

[57] ABSTRACT

A barrier laminate for making containers and cartons that substantially resist the absorption of essential oils and flavoring components, e.g. peel oil, as well as the oxidation of l-ascorbic acid (vitamin C) normally found in various beverages such as fruit and citrus juices. In a particularly preferred embodiment, the present laminate comprises a substrate material having a thin layer of PET-G (glycol-modified polyethylene terephthalate) bonded to the substrate's inner and outer surfaces, said PET-G layer becoming the beverage-contacting surface of containers made from such a laminate. In other particularly preferred embodiments, the barrier laminate also includes one or more intermediate layers of oxygen barrier materials between the laminate's substrate and beverage-contacting layer of PET-G. Also disclosed are methods of making such barrier laminates and containers therefrom.

13 Claims, 2 Drawing Sheets

BARRIER LAMINATES FOR THE RETENTION OF ESSENTIAL OILS, VITAMINS AND FLAVORS IN CITRUS BEVERAGES AND A METHOD OF MAKING SAID LAMINATE AND LEAK-TIGHT CONTAINERS THEREFROM

CROSS-REFERENCE TO RELATED APPLICATION

This application is a continuation-in-part of co-pending application Ser. No. 774,276, filed Sept. 10, 1985 in the names of the present applicants now abandoned.

TECHNICAL FIELD

The present invention relates to barrier laminates, a method of making said laminates, and containers made therefrom, as well as filled and sealed containers of fruit juice which are more shelf stable due to the barrier properties exhibited by said containers. More particularly, the present invention relates to barrier laminates useful in making containers and cartons that substantially resist the absorption and/or loss of essential oils, vitamins and flavor components found in various beverages contained therein. In a particularly preferred embodiment, the present invention relates to filled and sealed, leak resistant containers of citrus juice containing both peel oil and l-ascorbic acid (vitamin C), said juice exhibiting levels of both peel oil and l-ascorbic acid approaching those initially present when the juice was first introduced into the containers, even after the filled and sealed containers have been subjected to extended periods of storage prior to consumption of the juice.

BACKGROUND OF THE INVENTION

In recent years, fruit juice manufacturers and the consuming public have become somewhat critical of the standard polyethylene-coated paperboard container currently on the market because of its propensity to absorb and/or lose various essential oils, vitamins and critical flavoring components found in most fruit and citrus beverages. With specific reference to citrus, peel oil readily diffuses through the container's inner polyethylene coating and becomes absorbed by both the polyethylene and the paperboard substrate itself, thereby significantly detracting from the fruit juice's flavor and quality. In addition, oxygen readily penetrates the container and oxidizes various flavoring components found in the juice, including the l-ascorbic acid (vitamin C) which can decompose into other materials, thereby reducing the product's l-ascorbic acid (vitamin C) content and also adversely affecting the juice's flavor. A more detailed description of the problems associated with using polyethylene-lined cartons to store citrus beverages is set forth in U.S. Pat. No. 4,529,606, which is hereby incorporated herein by reference.

One well known attempt to solve the above-identified problem has been to make containers from a laminate having an intermediate metal foil layer, usually aluminum. An example of a paperboard/aluminum foil/polyethylene laminate is described and disclosed in U.S. Pat. No. 3,365,111, which is hereby incorporated herein by reference. As described therein, the intermediate aluminum foil layer does provide a good barrier against oxygen from entering the container. In addition, the foil does inhibit the beverage's essential oils from being absorbed by the paperboard base. Nonetheless it has been found that the beverage-contacting polyethylene layer continues to readily absorb an unacceptable amount of the beverage's essential oils and flavoring components.

Another attempt at solving the above-identified problem of retaining essential oils, vitamins (particularly vitamin C) and flavoring components found in various packaged citrus beverages is disclosed in U.S. Pat. No. 4,513,036, which issued on Apr. 23, 1985. The barrier laminate disclosed therein comprises, from the outer surface to the inner surface, a paperboard substrate, a web of propylene polymer coated thereon, and a web of olefin polymer overlying the propylene polymer web. Preferably, the paperboard substrate is also coated on its external surface with a web of heat sealable olefin polymer. However, the exemplary data set forth in the patent disclose that over a six week storage period containers made from such a laminate only provide a marginal improvement in retaining essential oil, specifically d-limonene (a major component in peel oil), when contrasted with a standard polyethylene/paperboard/polyethylene laminate container. In particular, the preferred carton structure exhibited a 39.5 percent loss of essential oil vs. a 60.5 percent loss of essential oil for the standard polyethylene/paperboard/polyethylene carton. The preferred carton structure exhibited an even smaller degree of improvement over the standard carton with respect to retention of vitamin C. In particular, the standard polyethylene/paperboard/polyethylene carton exhibited an 84 percent loss of vitamin C at the end of the six week period, while the preferred carton structure exhibited a 71 percent loss over the same period.

It is generally known in the art that a polyester, such as PET (polyethylene terephthalate), has excellent flavor barrier properties. It is therefore not surprising that PET is used extensively in forming blow-molded bottles to contain beverages such as soft drinks. There has also been some success with indirectly laminating PET to paperboard for use in other applications. For example, U.S. Pat. No. 4,455,184 discloses a method of coextruding a PET layer with an intermediate layer of polymeric adhesive to a paperboard substrate. The resultant laminate is useful in constructing shallow ovenable trays, it being well known in the art that it is extremely difficult to heat-seal PET to PET as would be the case in trying to make a PET-lined, gable-top carton such as that disclosed in U.S. Pat. No. 3,120,333. The major difficulty in making such a sealed carton lies with the extreme temperatures (around 500° F.) required to heat seal PET to PET. Indeed, at such extreme temperatures, common paperboard severely discolors and even starts to burn. To make matters even worse, PET crystalizes when cooled from such temperatures necessary to create a PET/PET heat seal, thereby making it virtually impossible to obtain commercially-reliable, liquid-tight seals.

Recently, a new polyester resin generally referred to as PET-G (glycol-modified polyethylene terephthalate) has been introduced in the marketplace. For example, U.S. Pat. No. 4,572,340 issued to Ferrante et al. on Feb. 18, 1986 discloses an ovenable self-opening bread dough container. In a preferred embodiment, glycol-modified polyethylene terephthalate is suggested for use as a dough-contacting liner over a substrate which may be comprised of paperboard.

Although the industry acknowledges PET-G's good clarity, barrier properties, and processability, the industry has failed until now to recognize that unlike PET, PET-G can be laminated to substrates such as paperboard without the need of intermediate adhesive layers or pre-treating the substrate with special materials or processes. Of further significance is the fact that unlike layers of PET, it has been found that layers of PET-G can be heat-sealed to one another to form a liquid-tight seal by using conventional heat-sealing techniques and equipment. Because of the inherently more amorphous nature of PET-G, required sealing temperatures are significantly lower than those required to seal PET. Moreover, stronger bonds can be achieved with PET-G due to the fact it has less tendency to crystalize upon cooling. In addition the lower bonding and sealing temperatures of PET-G minimize the chance of browning the paperboard substrate. Accordingly, the present invention is directed to a vast array of laminates that are extremely useful in making economical cartons and containers that not only do an excellent job of preserving and maintaining flavor volatiles found in the beverage contained therein, but also exhibit commercially acceptable, liquid-tight seals.

In light of the above, a principal object of the present invention is to provide various economical barrier laminates that are useful in making containers exhibiting superior retention and preservation of essential oils, vitamins and flavoring components found in various liquids contained therein, said laminates comprising a base substrate such as paperboard, and a beverage-contacting innermost layer of heat-sealable PET-G. In other particularly preferred embodiments, the laminates also include intermediate layers of oxygen-barrier materials such as aluminum foil, PET, nylon, polyvinylidene chloride (PVDC), and ethylene-vinylalcohol copolymer (EVAL).

Another principal object of the present invention is to provide economical containers that are constructed from said superior barrier laminates for the retention of essential oils, vitamins and flavoring components found in many liquids, particularly peel oil and l-ascorbic acid (vitamin C), as normally found in citrus beverages. As will be appreciated, seals which are both gas and liquid tight are essential if such barrier laminate containers are to function in their intended manner.

Another object of the present invention is to provide a barrier laminate blank comprising a substrate having a product-contacting innermost layer of PET-G that can be readily folded and conventionally heat sealed to form a liquid-tight, economical carton that substantially preserves the essential oils, vitamins and flavoring components found in the beverage stored therein for a period of time which approximates the amount of time most beverage products remain in the carton prior to use by the consumer, e.g., typically about six weeks.

It is a further object of the present invention to provide a method of making superior barrier laminates such as PET-G/paperboard/PET-G and PET-G/PET/paperboard/PET-G that are useful in making conventionally heat-sealed containers for storing various beverages that contain essential oils, vitamins and flavoring components.

SUMMARY OF THE INVENTION

As used in the following summary and detailed description of the present invention, the terms "essential oils" and "flavor components" are intended to include those detectable components found in many beverages that have a direct impact on the flavor of such beverages, which in the case of orange juice includes peel oil (a major component of which is d-limonene). The term "vitamins" is intended to include materials such as l-ascorbic acid (vitamin C), which is normally present in citrus beverages, such as orange juice.

The present invention provides various barrier laminates that are useful in making containers and cartons for storing various beverages, particularly citrus beverages, that contain essential oils, vitamins and flavoring components. A common element which each barrier laminate of the present invention has is an innermost, beverage-contacting surface comprised of a thin layer or film of PET-G. As one example of a particularly preferred embodiment, the barrier laminate comprises a paperboard substrate having a thin layer of glycol-modified polyethylene terephthalate (PET-G) directly bonded to the paperboard's inner liquid-contacting surface and its outer surface. Other examples of suitable substrates include paper, metal foils, acrylonitrile-butadiene-styrene (ABS), styrene-acrylonitrile (SAN), polyvinylchloride (PVC), polystyrene (PS), polycarbonate (PC), polyethylene (PE), and polypropylene (PP). In other particularly preferred embodiments of the present invention, the barrier laminate comprises a substrate, an intermediate oxygen barrier such as polyvinylidene chloride (PVDC), ethylene-vinylalcohol copolymer (EVAL), nylon, PET, or aluminum foil; and a thin layer of PET-G as the container's beverage-contacting surface.

The barrier laminates described above are particularly well suited for constructing various types of sealed cartons, a well known example of which is the gable-top carton and blanks therefor disclosed in U.S. Pat. No. 3,120,333, which is hereby incorporated herein by reference. Another particularly well known beverage container in which such barrier laminates can be utilized is the Hypa-S container, which is a semi-rigid container available from Bosch Packaging Machinery, a division of Robert Bosch Technical Products Corporation, Piscataway, N.J. Other suitable containers, cartons, and packages that can be made from barrier laminates of the present invention include those disclosed in U.S. Pat. No. 3,795,359, which issued on Mar. 5, 1974 to Tetrapak International AB, Lund, Sweden; U.S. Pat. No. 3,977,591, which issued on Aug. 31, 1976 to A. B. Ziristor, Lund, Sweden, both references being hereby incorporated herein by reference. Yet other suitable containers, cartons, and the like that can be made from barrier laminates of the present invention include containers such as Tetra Paks®, Combi Blocs®, and foil-fiber cans, the latter being presently in wide use in the frozen orange juice concentrate industry.

Also disclosed herein are various methods of making such barrier laminates and cartons and containers therefrom.

BRIEF DESCRIPTION OF THE DRAWINGS

While the specification concludes with claims that particularly point out and distinctly claim the present invention, it is believed that the present invention will be better understood by reading the following description with references made to the following drawings in which:

DETAILED DESCRIPTION OF THE INVENTION

Figure 1:
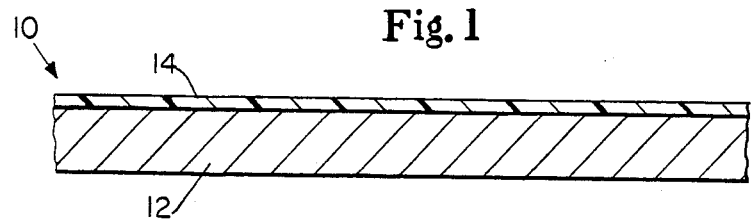
FIG. 1 is a cross-sectional view of one embodiment of a barrier laminate of the present invention.

FIG. 1 is a cross-sectional view of a superior barrier laminate 10 of the present invention. In FIG. 1, laminate 10 comprises a substrate material 12 such as paperboard having a thin layer 14 of glycol-modified polyethylene terephthalate (PET-G) bonded thereto. Of particular significance is that the layer of PET-G is directly bonded to paperboard substrate 12 without the need of an intermediate adhesive layer. Of further significance is the fact that paperboard substrate 12 need not exhibit special characteristics such as having been coated with a primer or having been subjected to a special treatment such as a corona discharge. For example, paperboard substrate 12 may comprise standard bleached kraft paper that is well known in the art of manufacturing containers.

Figure 3:
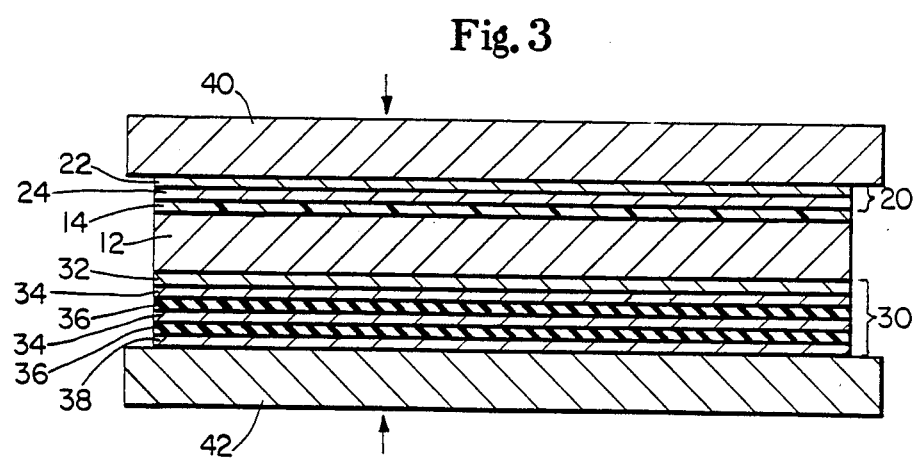
FIG. 3 is a cross-sectional view of an apparatus for making a barrier laminate of the present invention.

FIG. 3 illustrates an apparatus that was used in making the barrier laminate illustrated in FIG. 1. In FIG. 3, a 12"×12"×2.0 mil film 14 of PET-G, which was obtained from Van Leer Plastics of Houston, Tex. and identified as Product #42002, was placed directly on the upper surface of a raw, uncoated, 12"×12"×24 mil paperboard substrate 12, which was obtained from the International Paper Company of Stamford, Conn. and substantially identical to the paperboard substrate used in making their standard, polyethylene-coated gable top carton. Next, paperboard substrate 12 and PET-G film 14 were placed between a top press liner generally indicated as 20 comprising a top sheet of 0.030" thick aluminum 22 and a bottom sheet of fluoroglass release material 24, and a bottom press liner generally indicated as 30 comprising from top to bottom a sheet of fluoroglass release material 32, a 0.018" thick sheet of posterboard 34, a 1/32" thick mat of silicone rubber 36, another 0.018" thick sheet of posterboard 34, another 1/32" thick mat of silicone rubber 36, and a lowermost sheet of 0.030" thick aluminum 38. The resultant "sandwich" was then placed in a conventional heat press having the top platen 40 heated to approximately 250° F. and a bottom platen 42 at room temperature. Fifty (50) tons (approximately 700 psi) was applied to the "sandwich" for approximately 30 seconds. The press was then deactivated and the PET-G coated paperboard substrate removed. Of particular significance was the fact that the PET-G itself bonded extremely well to the paperboard without requiring an intermediate adhesive layer between the PET-G and the paperboard, and without having to pretreat the paperboard substrate with, for example, an electrical discharge. In fact, when the PET-G film was manually peeled away from the laminate, the PET-G film was covered with adhered paperboard fibers, thereby indicating that the PET-G/paperboard bond was significantly stronger than the bond holding the individual paperboard fibers together.

Figure 2:
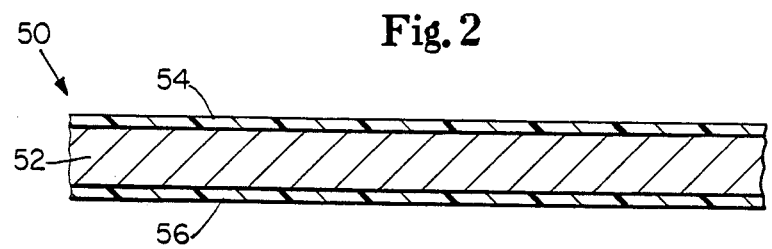
FIG. 2 is a cross-sectional view of a particularly preferred barrier laminate of the present invention.

Because of the inherently more amorphous nature of PET-G, required sealing temperatures are significantly lower than those required to seal PET. Moreover, stronger bonds can be achieved with PET-G due to the fact it has less tendency to crystalize upon cooling. In addition the lower bonding and sealing temperatures of PET-G minimize the chance of browning the paperboard substrate. FIG. 2 is a cross-sectional view of a particularly preferred laminate that is useful in constructing heat sealed containers and cartons. In FIG. 2, barrier laminate 50 comprises a paperboard substrate 52 having a thin layer 54 of PET-G bonded to the paperboard's surface that corresponds to the laminate's liquid-contacting surface when laminate 50 is formed into a container or carton. Barrier laminate 50 also has another thin layer 56 of PET-G, which was applied to the outer surface of paperboard substrate 52 by substantially following the same method of application as described above in either a single stage or two-stage process. Such an externally and internally lined laminate is particularly well suited for making paperboard blanks that are intended to be folded into a carton and heat sealed in the areas where the carton's outer and inner surface overlap one another, such as the carton's side seam, bottom panels, and top panels. An example of such a carton is the gable-topped carton disclosed in U.S. Pat. No. 3,120,333, which again is hereby incorporated herein by reference.

In making gable-top cartons from the barrier laminate disclosed herein, it was surprisingly found that conventional blank forming, folding, and sealing techniques well known to those skilled in the art of gable-topped carton manufacturing could be employed. Particularly surprising was the discovery that unlike layers of PET, layers of PET-G readily adhere to one another after being subjected to a conventional heat sealing operation utilizing modest temperatures and pressures while at the same time providing commercially-acceptable, liquid-tight seals. For example, a barrier laminate comprising PET-G/paperboard/PET-G was cut and scored into a gable-top blank with a common die and press at a pressure of 60 psig. Next, the blank was folded into a rectangular tube followed by heat sealing the side seam with a heat sealer set at 250° F. and pressure of 60 psig held for approximately 30 seconds. Next, the bottom flaps were heat sealed with a bottom heat sealer set at 275° F. and pressure of 60 psig held for approximately one minute. The carton was then filled with orange juice, followed by heat sealing the carton's top flaps with a conventional top heat sealer presently used in the industry. Of particular significance was the fact that unlike PET/PET heat seals, the PET-G/PET-G heat seals were liquid-tight and extremely reliable. In part, this is believed to be due to the fact that PET crystalizes when cooled from the temperature necessary to create a heat seal (around 500° F.), while PET-G does not substantially crystalize when cooled from its required heat sealing temperature of around 275° F.

Figure 4:
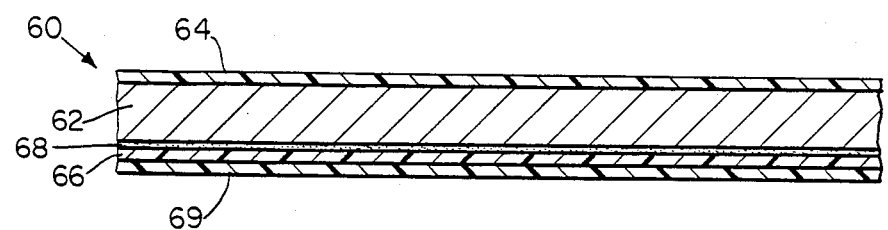
FIG. 4 is a cross-sectional view of another particularly preferred barrier laminate of the present invention.

It has been found that a carton or a container having a layer of PET-G as its beverage-contacting surface significantly inhibits the absorption/permeation of essential oils, and flavoring components. Depending upon the shelf life of the product, the thickness of the PET-G layer and the susceptibility of the product to degradation by oxidation, it has sometimes been found that PET-G itself may prove somewhat deficient in preventing oxygen from entering the carton or container. As mentioned earlier herein, oxygen will oxidize various components found in many beverages, including l-ascorbic acid (vitamin C), thereby producing somewhat of an off flavor. A solution to this problem is to include an intermediate oxygen barrier layer between the laminate's substrate and the PET-G beverage-contacting layer. For example, an intermediate layer of PET between the laminate's substrate and the laminate's liquid-contacting layer of PET-G provides an excellent oxygen barrier. Such a barrier laminate is illustrated in FIG. 4. In FIG. 4, barrier laminate 60 comprises a substrate 62 such as paperboard having an outer layer 64 of PET-G bonded directly thereto. Laminate 60 has an intermediate layer 66 of PET adhered to the inner surface of substrate 62 by means of an adhesive layer 68 such as that disclosed in U.S. Pat. No. 4,455,184, which is hereby incorporated herein by reference. Finally, barrier laminate 60 has an innermost, beverage-contacting layer 69 of PET-G directly bonded to intermediate PET layer 66 through the simultaneous application of heat and pressure.

Other examples of intermediate, oxygen-barrier materials that can be substituted for intermediate PET layer 68 in FIG. 4 include aluminum foil, PVDC, EVAL, and nylon. In some instances, it is also necessary to include tie layer resins between the laminate's substrate (such as paperboard) and such intermediate oxygen-barrier layers. In general, tie layer resins are polyolefin-based, interlaminar bonding agents used to adhere incompatible layers in coextruded or laminated structures. In addition to bonding dissimilar polymer layers, tie resins are also used to bond polymers to metals (foils), boardstocks, and paper. Such materials are either coextruded between other polymers, or extrusion coated onto other substrates before being combined into composite structures through the application of heat and pressure. Coextrusion applications include cast film and sheet, blown film, and extrusion blow-molded bottles.

Typical tie resins include CXA resins from DuPont, and the PLEXAR family available from Northern Petrochemical Company (Norchem). CXA resins are multi-functional polymers based on an ethylene backbone. They include ethylene vinyl acetate terpolymers, quatrapolymers, and other types of modified polyolefins. PLEXAR resins are produced from modified LDPE, MDPE, HDPE, PP, and EVA copolymers.

The choice of tie resin for a particular application depends on various factors such as the chemical nature of the materials to be bonded, the melt viscosities of the other resins to be coextruded, stock processing temperatures, the type of process utilized, and the type of processing equipment. The tie resins offered by the above-identified suppliers cover a wide melt index range and are capable of bonding numerous base materials used in packaging applications as indicated in an article entitled, "What Can Be Coextruded? The Sky's The Limit" appearing at pp. 78-80 of the September, 1980 edition of *Modern Plastics* magazine, said reference being hereby incorporated herein by reference.

COMPARATIVE EXAMPLE I

To illustrate the superior ability of a PET-G lined carton made and filled in the above-described manner to retain peel oil, which is considered to be one of the essential oils found in orange juice, an "aging study" was conducted on orange juice that had been stored in gable-topped cartons made from a barrier laminate of the present invention. Also tested were various prior art cartons and containers for comparison. The filled cartons were stored at 40° F. for a thirty-five day period after which time the orange juice was analyzed to determine the percentage loss of essential peel oil. The results are listed in TABLE 1 below.

TABLE 1

|  | % peel oil loss |
|---|---|
| Carton A | 60 |
| Carton B | 45 |
| Carton C | 25 |
| Carton D | 16 |
| Bottle E | 5 |

Carton A - standard polyethylene/paperboard/polyethylene carton
Carton B - polypropylene/paperboard/polypropylene carton
Carton C - polyethylene//paperboard/polyethylene/aluminum foil/polyethylene carton
Carton D - PET-G/paperboard/PET-G carton of the present invention
Bottle E - glass (control)
All cartons and bottles were 1 quart size with the exception of carton B, which was one-half gallon size.

The procedure substantially followed in measuring the % loss of peel oil is described in detail in Scott, Clifford and M. K. Veldhuis, "Rapid Estimate of Recoverable Oil in Citrus Juices by Bromate Titration", *Journal of the Association of Agricultural Chemists,* Vol. 49, No. 3, 628-633 (1966), said reference being hereby incorporated herein by reference.

Note from the foregoing "aging study" that the preferred structure designated "Carton D" exhibited a substantial improvement in peel oil retention over all other carton structures tested, even approaching the level of retention exhibited by the glass (control) designated "Bottle E".

COMPARATIVE EXAMPLE II

To examine the ability of PET-G lined cartons made and filled in the same manner as the sample designated "Carton D" in Comparative Example I to retain both peel oil and l-ascorbic acid (vitamin C), which is also normally found in orange juice, another orange juice "aging study" was conducted, again using Sample "D" type cartons of the present invention. The filled cartons were also stored at 40° F. Except for week 5, as noted below, two of the filled cartons were analyzed at the end of each week during a 6 week study to determine both the percentage loss of essential peel oil and the percentage loss of l-ascorbic acid (vitamin C). The average values for each set of weekly results are listed in Table II below:

TABLE II

| | Week 1 | | Week 2 | | Week 3 | | Week 4 | | Week 5 | | Week 6 | |
|---|---|---|---|---|---|---|---|---|---|---|---|---|
| | % Peel Oil Loss | % Vit. C Loss | % Peel Oil Loss | % Vit. C Loss | % Peel Oil Loss | % Vit. C Loss | % Peel Oil Loss | % Vit. C Loss | % Peel Oil Loss | % Vit. C Loss | % Peel Oil Loss | % Vit. C Loss |
| Carton D | 1.1 | 1.1 | 3.3 | 6.2 | 2.2 | 11.5 | 5.5 | 13.5 | 5.5 | — | 6.6 | 18.3 |

The procedure for measuring the % loss of peel oil was essentially the same as that used in Comparative Example I, while the procedure which was substantially followed for measuring % loss of I-ascorbic acid (vitamin C) is generally described at pages 65-66 of the *Quality Control Manual for Citrus Processing Plants* published by INTERCIT, INC., 1575 South Tenth Street, Safety Harbor, Fla. 33572, as revised and enlarged by V. C. Praschan, (1975), which publication is hereby incorporated herein by reference.

COMPARATIVE EXAMPLE III

To compare the ability of PET-G lined cartons of the type made and tested in Comparative Examples I and II (Carton D) with the other type of containers tested in Comparative Example I relative to retaining l-ascorbic acid (vitamin C), another "aging study" was conducted on orange juice using cartons of the same type described in conjunction with Comparative Example I. These filled cartons were also stored at 40° F. At the end of three weeks and again at the end of 6 weeks a filled carton of each type was analyzed to determine both the percentage loss of essential peel oil and the percentage loss of l-ascorbic acid (vitamin C). The results are listed in Table III below:

TABLE III

|  | Week 3 | | Week 6 | |
| --- | --- | --- | --- | --- |
|  | % Peel Oil Loss | % Vit. C Loss | % Peel Oil Loss | % Vit. C Loss |
| Carton A | 35.3 | 42.5 | 64.7 | 75.0 |
| Carton B | 23.5 | 32.1 | 41.2 | 56.2 |
| Carton C | 29.4 | 13.1 | 29.4 | 34.0 |
| Bottle E | 0 | 4.9 | 0 | 24.9 |

The procedures used for measuring the % loss of peel oil and % loss of l-ascorbic acid (vitamin C) were essentially the same as in Comparative Examples I and II.

From the data set forth in Comparative Examples I, II and III, above, it is clear that heat sealed and foldable cartons made from a barrier laminate of the present invention (Carton D) are superior to other prior art heat sealed foldable cartons in retaining both peel oil and l-ascorbic acid (vitamin C), two important ingredients normally present in citrus beverages. Indeed, the cartons made from a barrier laminate of the present invention came close to matching the ability of glass in preserving both peel oil and l-ascorbic acid (vitamin C).

While several particularly preferred embodiments of the present invention have been described and illustrated, it will be obvious to those skilled in the art that various changes and modifications can be made thereto without departing from the spirit and scope of the invention. Furthermore, although the preceding description of the present invention was generally addressed to making a superior barrier laminate for making containers that will retain a substantial amount of essential oil, vitamins and flavoring components found in fruit juices contained therein, the present invention can be applied with equal facility to any container or carton that is intended to contain other beverages and products having similarly difficult to retain, essential components. Accordingly, the following claims are intended to embrace such changes, modifications, and other areas of application that are within the scope of this invention.

What is claimed is:

1. A heat-sealed, leak-tight product container made from a foldable laminated blank, said container comprising:

a multiplicity of side wall panels which are interconnected to one another to form a tubular body of generally rectangular cross-section and fold-in top and bottom closures which are heat-sealed to one another to form substantially uncrystalized leak-tight seals, said foldable laminated container blank comprising a substrate material having an inner surface and an outer surface, said substrate material being selected from the group consisting of paper, paperboard, fiberboard and bleached kraft paper, said inner surface having a layer of glycol-modified polyethylene terephthalate bonded thereto, said foldable laminated container blank being so assembled and heat-sealed that the product-contacting surface of said container is comprised substantially entirely of said layer of glycol-modified polyethylene terephthalate.

2. The container recited in claim 1, wherein said outer surface of said substrate material of said foldable laminated container blank has a layer of glycol-modified polyethylene terephthalate bonded thereto.

3. The container recited in claim 1 or claim 2, wherein substantially all of said beverage-contacting surface of said container is comprised of substantially uncrystalized glycol-modified polyethylene terephthalate.

4. A heat-sealed, leak-tight product container made from a foldable laminated blank, said container comprising:

a multiplicity of side wall panels which are interconnected to one another to form a tubular body of generally rectangular cross-section and fold-in top and bottom closures which are heat-sealed to one another to form substantially uncrystalized leak-tight seals, said foldable laminated container blank comprising a substrate material having an inner surface and an outer surface, said substrate material being selected from the group consisting of paper, paperboard, fiberboard and bleached kraft paper, said inner surface having an intermediate layer of oxygen barrier material bonded to said inner surface of said substrate material, and a layer of glycol-modified polyethylene terephthalate bonded to said intermediate layer of oxygen barrier material, said foldable laminated container blank being so assembled and heat-sealed that the product contacting surface of said container is comprised substantially entirely of said layer of glycol-modified polyethylene terephthalate.

5. The container recited in claim 4, wherein said intermediate layer of oxygen barrier material is selected from the group consisting of polyvinylidene chloride, ethylene-vinyl alcohol copolymer, nylon, polyethylene terephthalate, and metal foils.

6. The container recited in claim 4 or claim 5, wherein said outer surface of said substrate material of said foldable laminated container blank has a layer of glycol-modified polyethylene terephthalate bonded thereto.

7. The container recited in claim 4 or claim 5, wherein substantially all of said beverage-contacting surface of said container is comprised of substantially uncrystallized glycol-modified polyethylene terephthalate.

8. In a container blank used for making a liquid-tight gable-top paperboard carton having side panels and fold-in top and bottom closures heat-sealed with conventional equipment, the improvement comprising an innermost layer of glycol-modified polyethylene terephthalate as the beverage-contacting surface of said gable-top carton, said layer of glycol-modified polyethylene terephthalate layer remaining substantially uncrystallized when heat-sealed with said conventional equipment.

9. In a liquid-tight gable-top paperboard carton having side panels and fold-in top and bottom closures being heat-sealed with conventional equipment, the improvement comprising an innermost layer of glycol-modified polyethylene terephthalate as the beverage-contacting surface of said gable-top carton, said layer of glycol-modified polyethylene terephthalate layer remaining substantially uncrystallized when heat-sealed with said conventional equipment.

10. A method of making a heat-sealed, leak-tight container made from a foldable laminated blank and containing a predetermind quantity of a beverage, said method comprising the steps of:
   (a) bringing a film of glycol-modified polyethylene terephthalate in direct contact with the inner surface of a web of substrate material, thereby forming a laminate, said substrate material being selected from the group consisting of paper, paperboard, fiberboard, and bleached kraft paper;
   (b) applying heat and pressure to said laminate to bond said film of glycol-modified polyethylene terephthalate to said web of substrate material without causing crystalization of said glycol-modified polyethylene terephthalate, thereby forming a barrier laminate;
   (c) cutting a one-piece foldable container blank from said barrier laminate, said container blank including a multiplicity of side wall panels which are interconnected to one another, said container blank further including fold-in top and bottom closures secured to said side wall panels;
   (d) erecting said foldable container blank to form a tubular body of generally rectangular cross-section and heat-sealing said bottom closure and said side wall panels to one another by the application of heat and pressure without causing crystalization of said glycol-modified polyethylene terephthalate, said container being so erected and heat-sealed that said glycol-modified polyethylene terephthalate comprises the beverage-contacting surface of said container;
   (e) filling said beverage into said erected container; and
   (f) heat-sealing said top closure to form a leak-tight seal with said side wall panels by applying heat and pressure thereto without causing crystalization of said glycol-modified polyethylene terephthalate, whereby substantially all of said beverage-contacting surface of said heat-sealed container is comprised of substantially uncrystalized glycol modified polyethylene terephthalate.

11. The method recited in claim 10, further comprising the steps of:
   (a) bringing a second film of glycol-modified polyethylene terephthalate in direct contact with the outer surface of said web of substrate material; and
   (b) bonding said second film of glycol-modified polyethylene terephthalate to the outer surface of said web of substrate material without causing crystalization of said second film of glycol-modified polyethylene terephthalate, thereby forming a two-sided barrier laminate prior to cutting said foldable container blank from said barrier laminate.

12. The method of claim 10 or claim 11, further comprising the step of:
   (a) bonding an intermediate layer of oxygen barrier material to the inner surface of said substrate material prior to bonding said film of glycol-modified polyethylene terephthalate to said inner surface of said substrate material.

13. The method of claim 8 wherein said beverage is a citrus beverage containing peel oil and I-ascorbic acid.

* * * * *